United States Patent [19]
Ryan

[11] Patent Number: 5,788,330
[45] Date of Patent: Aug. 4, 1998

[54] SEAT HINGE MECHANISM WITH EASY ENTRY MEMORY FEATURE

[75] Inventor: Christopher J. Ryan, Fraser, Mich.

[73] Assignee: Fisher Dynamics Corporation, St. Clair Shores, Mich.

[21] Appl. No.: 824,924

[22] Filed: Mar. 27, 1997

[51] Int. Cl.[6] ................................................ B60N 2/20
[52] U.S. Cl. ............................ 297/378.12; 297/367
[58] Field of Search ........................ 297/378.12, 367, 297/366, 368, 369, 378.1

[56] References Cited

U.S. PATENT DOCUMENTS

| | | |
|---|---|---|
| 4,502,730 | 3/1985 | Kazaoka et al. ................. 297/367 X |
| 4,660,886 | 4/1987 | Terada et al. ................. 297/378.12 X |
| 4,762,366 | 8/1988 | Bauer et al. ................. 297/367 |
| 5,156,439 | 10/1992 | Idlani et al. ................. 297/367 |
| 5,522,643 | 6/1996 | Matsuura ................. 297/378.12 X |

*Primary Examiner*—Peter R. Brown
*Attorney, Agent, or Firm*—Harness, Dickey & Pierce, P.L.C.

[57] ABSTRACT

A seat hinge assembly is disclosed that is operable for permitting selective reclining movement of a seatback relative to a seat bottom between an upright position and a fully-reclined position. The seat hinge assembly is further operable to permit the seatback to be pivoted from any reclined position to a forward dumped position. Upon return of the seatback from its forward dumped position, the seat hinge assembly is adapted to relatch the seatback in its previous reclined position.

25 Claims, 5 Drawing Sheets

SEAT HINGE MECHANISM WITH EASY ENTRY MEMORY FEATURE

BACKGROUND OF THE INVENTION

1. Field of the Invention

The present invention relates to a seat for use in passenger-type motor vehicles and, more specifically, to a seat hinge assembly having an easy entry memory feature that is operable for relatching the seatback in its previous reclined position upon return of the seatback from its forward dumped position.

2. Description of the Background

Virtually all passenger-type motor vehicles are now equipped with front seats having a recliner mechanism that can be selectively actuated for permitting the seat occupant to adjust the angular position (i.e., the "reclined" position) of the seatback relative to the seat bottom between an upright position and a fully-reclined position. As an easy entry feature, the front seats in most two-door motor vehicles also include a dump mechanism that can be selectively actuated to permit forward folding (i.e., "dumping") of the seatback for providing greater access to the rear seating area of the vehicle's passenger compartment. In some instances, the recliner mechanism is released when the dump mechanism is actuated to permit the seatback to be folded forwardly to its dumped position. However, upon the seatback being returned from its dumped position, the recliner mechanism automatically locks the seatback in a predefined position such as, for example, the upright position. Thus, the recliner mechanism must be subsequently actuated to reset the seatback in the preferred reclined position. To eliminate the need to readjust the position of the seatback, some front seats also provide a memory feature for automatically relatching the seatback in its previous reclined position upon return of the seatback from its dumped position. Typically, the memory feature is provided by a memory mechanism that works in conjunction with the recliner mechanism. Unfortunately, most memory mechanisms are relatively complex and expensive.

In view of the above, a continuing need exists to develop a seatback dump mechanism equipped with a memory feature which overcomes the stated problems and yet which is operable to ensure that the seatback is automatically relatched in its previous reclined position when the seatback is returned from its forward dump position.

SUMMARY OF THE INVENTION

Accordingly, it is an object of the present invention to provide a seat hinge assembly for a vehicle seat that is operable to permit selective reclining and dumping movement of the seatback and which has a memory feature for returning the seatback to its previous reclined position after the dumping operation has been performed.

A further object of the present invention is to provide a seat hinge assembly for a vehicle seat which is operable to permit the reclined position of the seatback to be adjusted independently of the memory feature.

Still another object of the present invention is to provide a seat hinge assembly having the above-noted features and yet which is simple in structure, inexpensive to manufacture, easy to mass produce and durable in use.

According to a preferred construction, the seat hinge assembly of the present invention is adapted for use in a seat assembly to support a seatback for pivotal movement relative to a seat bottom. The seat hinge assembly includes a lower hinge member adapted for fixation to the seat bottom and an upper hinge member adapted for fixation to the seatback and which is supported for pivotal movement relative to the lower hinge member. The seat hinge assembly also includes a latching mechanism which is normally operable in a latched mode for securing the upper hinge member in a fixed position relative to the lower hinge member, thereby retaining the seatback in a selected reclined position. The latching mechanism is also operable in an unlatched mode for permitting the upper hinge member to pivot relative to the lower hinge member through a predetermined range of motion defined between the limits of a fully-reclined position and a forward dumped position. A recline actuator mechanism is provided for permitting a seat occupant to selectively shift the latching mechanism from its latched mode into its unlatched mode when it is desired to adjust the reclined position of the seatback. The seat hinge assembly also includes a memory mechanism that is normally operable in a non-actuated mode for permitting independent adjustment of the reclined position of the seatback. However, when it is desired to move the seatback from its reclined position to its forward dumped position, a dump actuator mechanism is selectively actuated for shifting the memory mechanism into its actuated mode. Such shifting of the memory mechanism into its actuated mode functions to identify the current angular position of the upper hinge member relative to the lower hinge member, thereby identifying the current reclined position of the seatback. In addition, the dump actuator mechanism operably interconnects the memory mechanism to the latching mechanism such that the latching mechanism is automatically shifted from its latched mode into its unlatched mode in response to the memory mechanism being shifted from its non-actuated mode into its actuated mode. With the memory mechanism in its actuated mode, the seatback may be pivoted to its forward dumped position while the latching mechanism is maintained in its unlatched mode. When the seatback is returned to its previous reclined position, the memory mechanism is returned to its non-actuated mode and the latching mechanism is returned to its latched mode, thereby relatching the seatback.

As a further convenience feature, the memory mechanism can also include a seatback stop arrangement for preventing rearward reclining movement of the seatback upon actuation of the dump actuator mechanism. Thus, a person actuating the dump actuator mechanism does not have to restrain the seatback against reclining movement and, as such, is afforded greater convenience when using the dump feature.

Further scope of applicability of the present invention will become apparent from the detailed description given hereafter. However, it should be understood that the detailed description and specific examples, while indicating a best mode and preferred embodiment of the invention, are given by way of illustration only since various modifications and changes within a certain scope of the invention will become apparent to those skilled in the art from this detailed description.

BRIEF DESCRIPTION OF THE DRAWINGS

The present invention will become more fully understood from the detailed description given hereinbelow and the accompanying drawings wherein.

DETAILED DESCRIPTION OF THE PREFERRED EMBODIMENT

Figure 1:
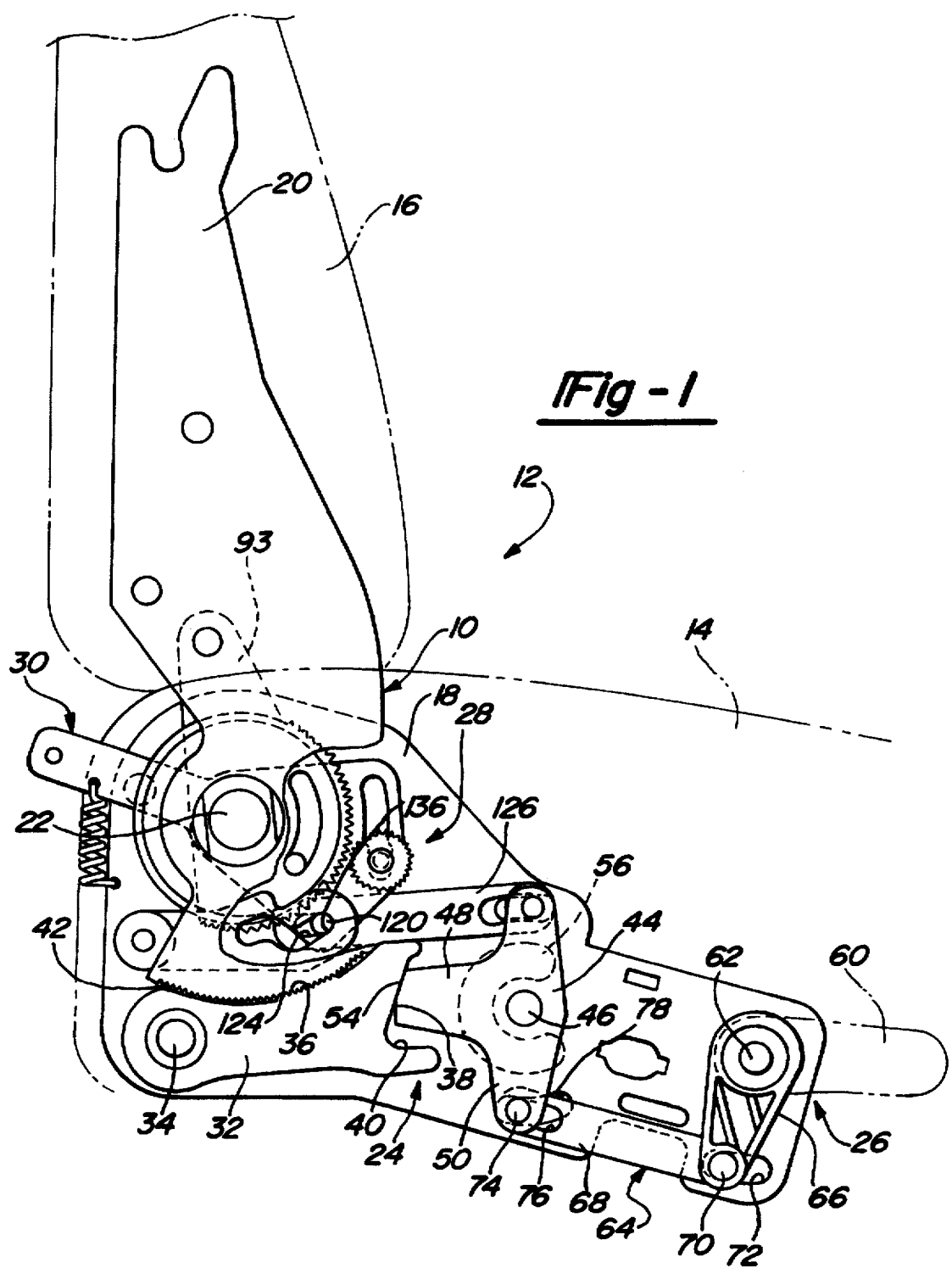
FIG. 1 is a side elevational view of a seat hinge assembly according to the present invention with its latching mechanism in a latched mode for retaining the seatback in a reclined position relative to the seat bottom while its memory mechanism is maintain in a non-actuated mode.

The present invention relates to a seat hinge assembly 10 adapted for incorporation into a seat assembly 12 having an upholstered seat bottom 14 and an upholstered seatback 16. Seat assembly 12 is of a type contemplated for use as the front seat in a passenger-type motor vehicle. For example, seat assembly 12 can be of the "all-belts-to seat" type (i.e., stand-alone structural seat). Seat hinge assembly 10 is preferably located along the outboard lateral side of seat assembly 12 to permit convenient actuation of its reclining and dumping features. As will be detailed, seat hinge assembly 10 is operable for permitting selective reclining movement of seatback 16 relative to seat bottom 14 between an upright position and a fully-reclined position. Seat hinge assembly 10 is further operable to permit seatback 16 to be pivoted from any reclined position to a forward dumped position for providing greater access to the area located behind seat assembly 12. Upon return of seatback 16 from its forward dumped position, seat hinge assembly 10 is operable to automatically relatch seatback 16 in its last (i.e., previous) reclined position.

Seat hinge assembly 10 includes a lower hinge member 18 which is adapted to be attached to a frame structure (not shown) associated with seat bottom 14 and an upper hinge member 20 which is adapted to be attached to a frame structure (not shown) associated with seatback 16. As shown, upper hinge member 20 is mounted on a hinge pin 22 for pivotal movement with respect to lower hinge member 18. In addition, seat hinge assembly 10 includes a latching mechanism 24 for releasably latching upper hinge member 20 to lower hinge member 18, a recline actuator mechanism 26 for controlling selective actuation of latching mechanism 24 to permit adjustment of the reclined position of seatback 16, a memory mechanism 28 for identifying the current reclined position of seatback 16 prior to forward dumping thereof, and a dump actuator mechanism 30 for controlling coordinated actuation of memory mechanism 28 and latching mechanism 24 to permit forward dumping of seatback 16.

As noted, latching mechanism 24 is operable, via actuation of recline actuator mechanism 26, to allow pivotal movement of upper hinge member 20 relative to lower hinge member 18. Latching mechanism 24 is normally operable in a "latched" mode for securing upper hinge member 20 in a fixed position relative to lower hinge member 18, thereby holding seatback 16 in a selected reclined position relative to seat bottom 14. Latching mechanism 24 is also operable in an "unlatched" mode in which upper hinge member 20 is free to pivot about hinge pin 22 between a fully-reclined position and a forward dumped position. With latching mechanism 24 in its unlatched mode, pivotal movement of upper hinge member 20 in a first (i.e., rearward) direction relative to lower hinge member 18 results in rearward angular movement of seatback 16 while pivotal movement of upper hinge member 20 in the opposite (i.e., forward) direction results in forward angular movement of seatback 16. Recline actuator mechanism 26 is operable for permitting a seat occupant to selectively shift latching mechanism 24 from its latched mode into its unlatched mode when it is desired to adjust the reclined position of seatback 16. As will be detailed, a biasing arrangement is provided for normally biasing latching mechanism 24 for operation in its latched mode.

Figure 2:
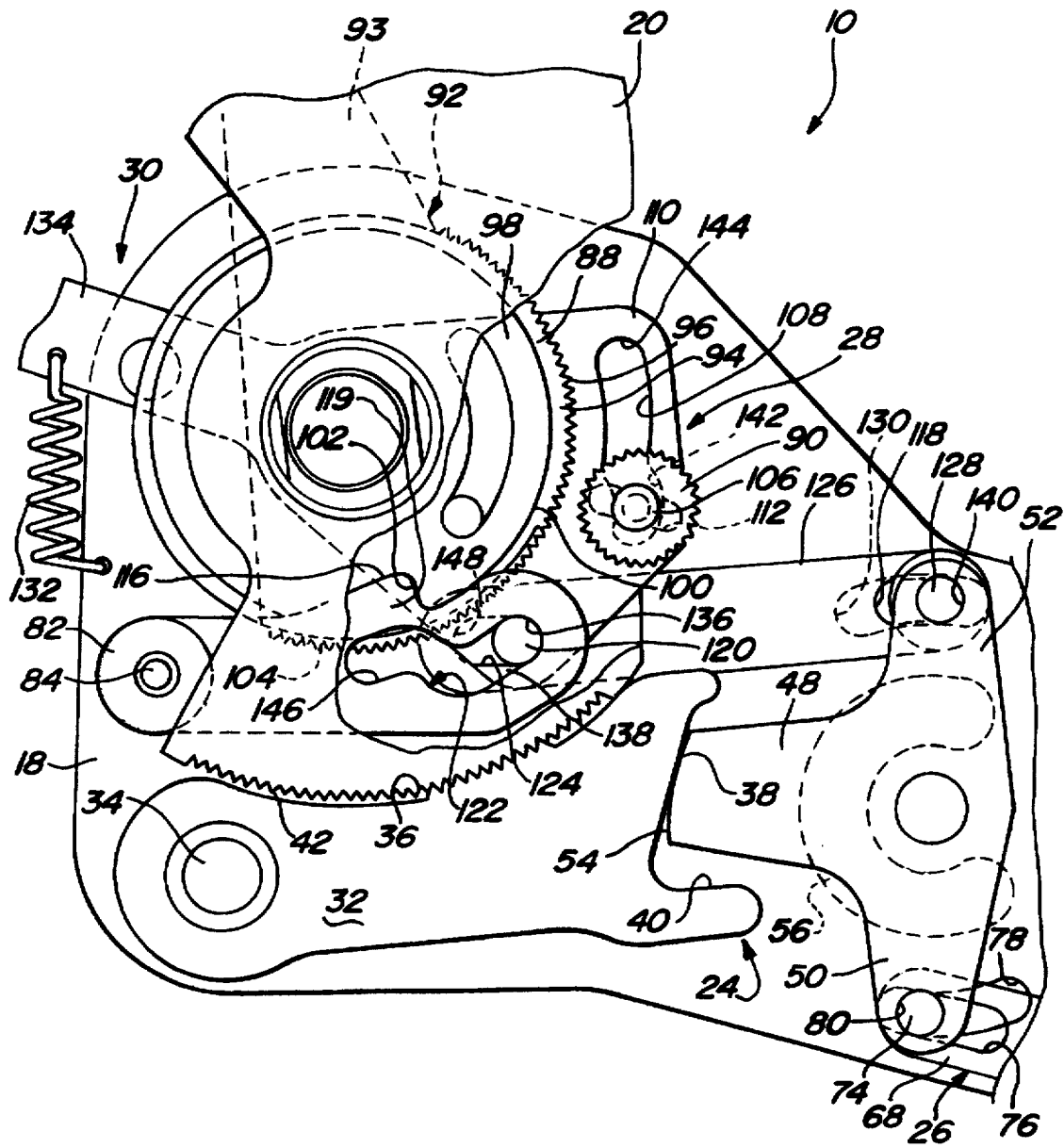
FIG. 2 is an enlarged partial view of the seat hinge assembly shown in FIG. 1.
Figure 3:
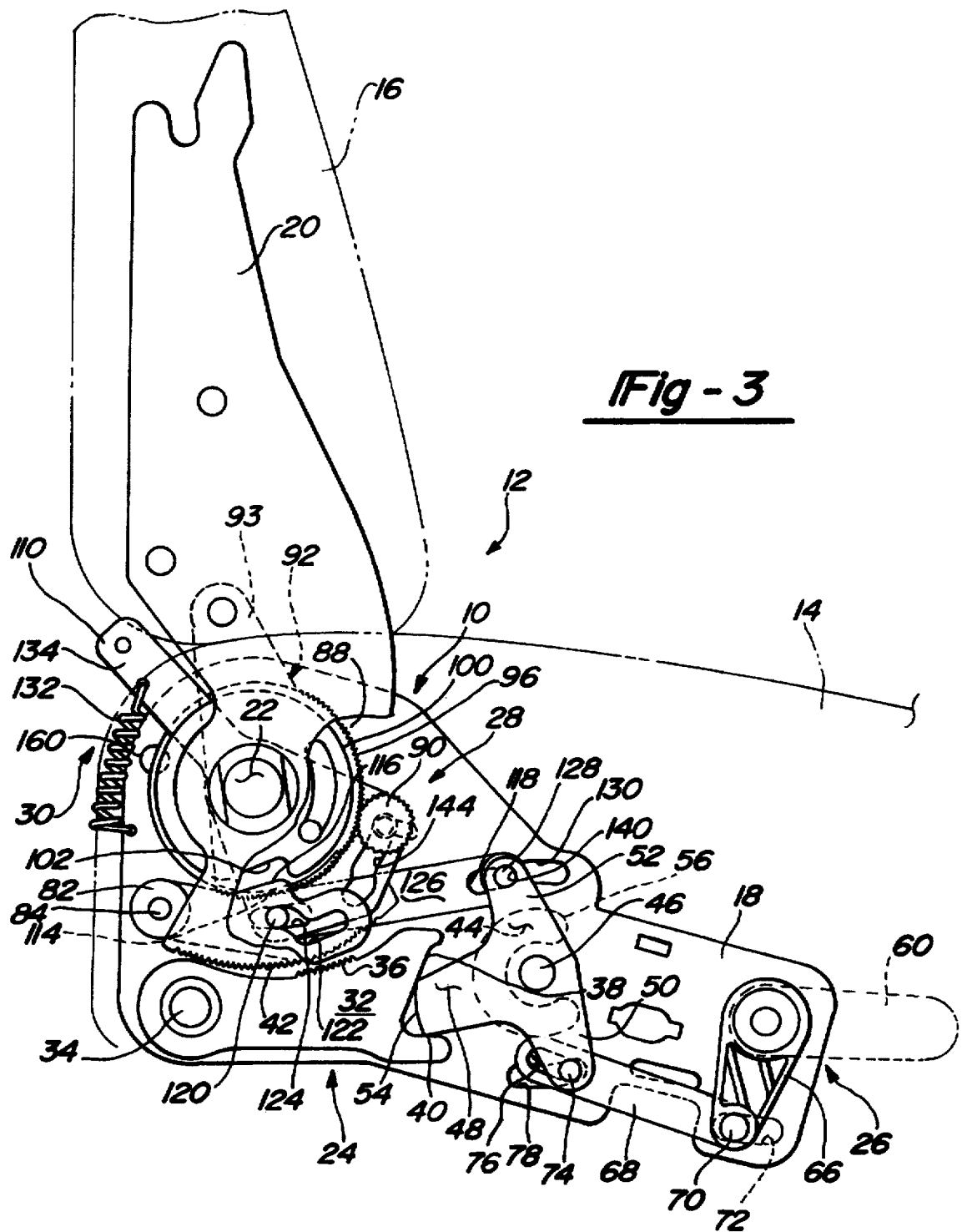
FIG. 3 shows the seat hinge assembly of the present invention with its memory mechanism in an actuated mode and its latching mechanism in an unlatched mode so as to permit subsequent forward dumping of the seatback.
Figure 4:
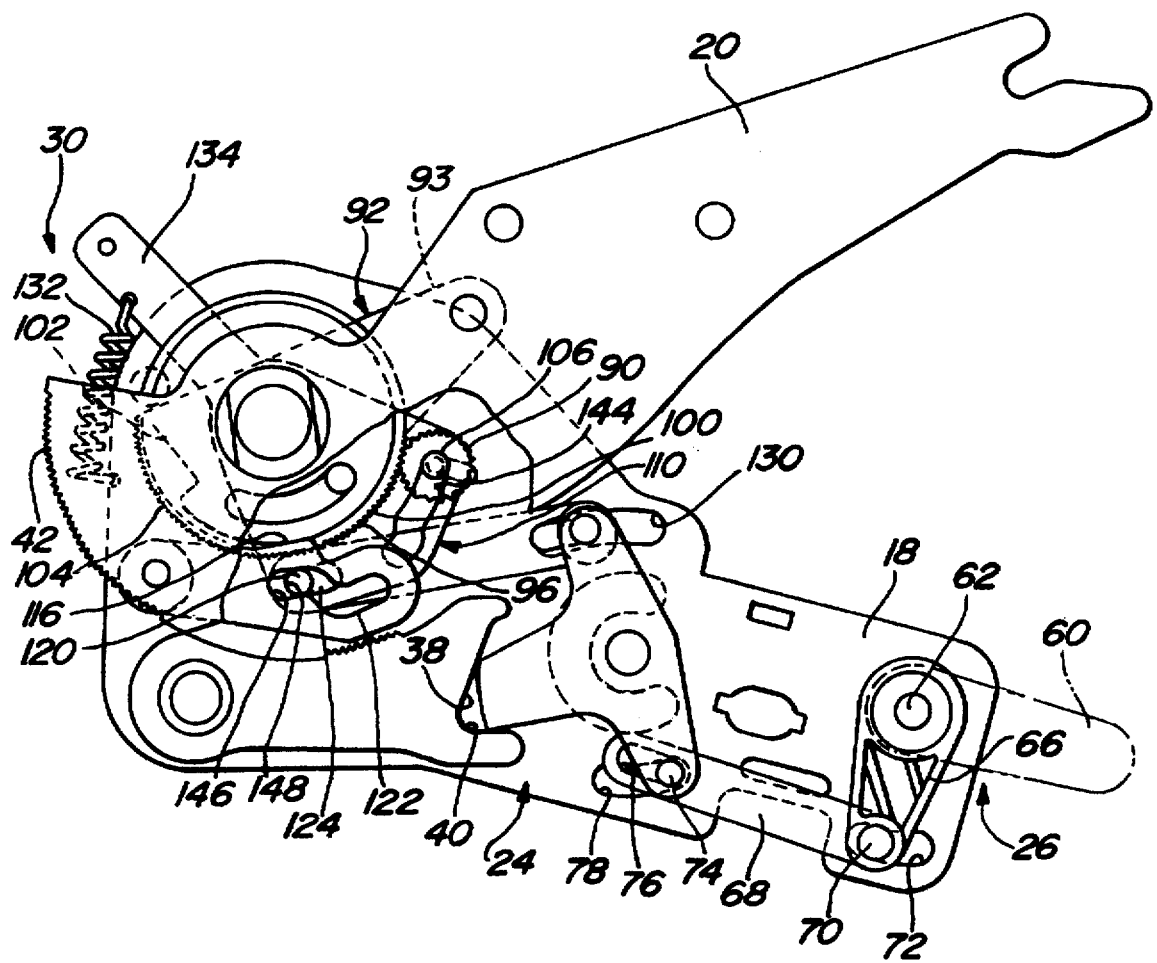
FIG. 4 shows the seat hinge assembly with the seatback rotated to its forward dumped position.
Figure 5:
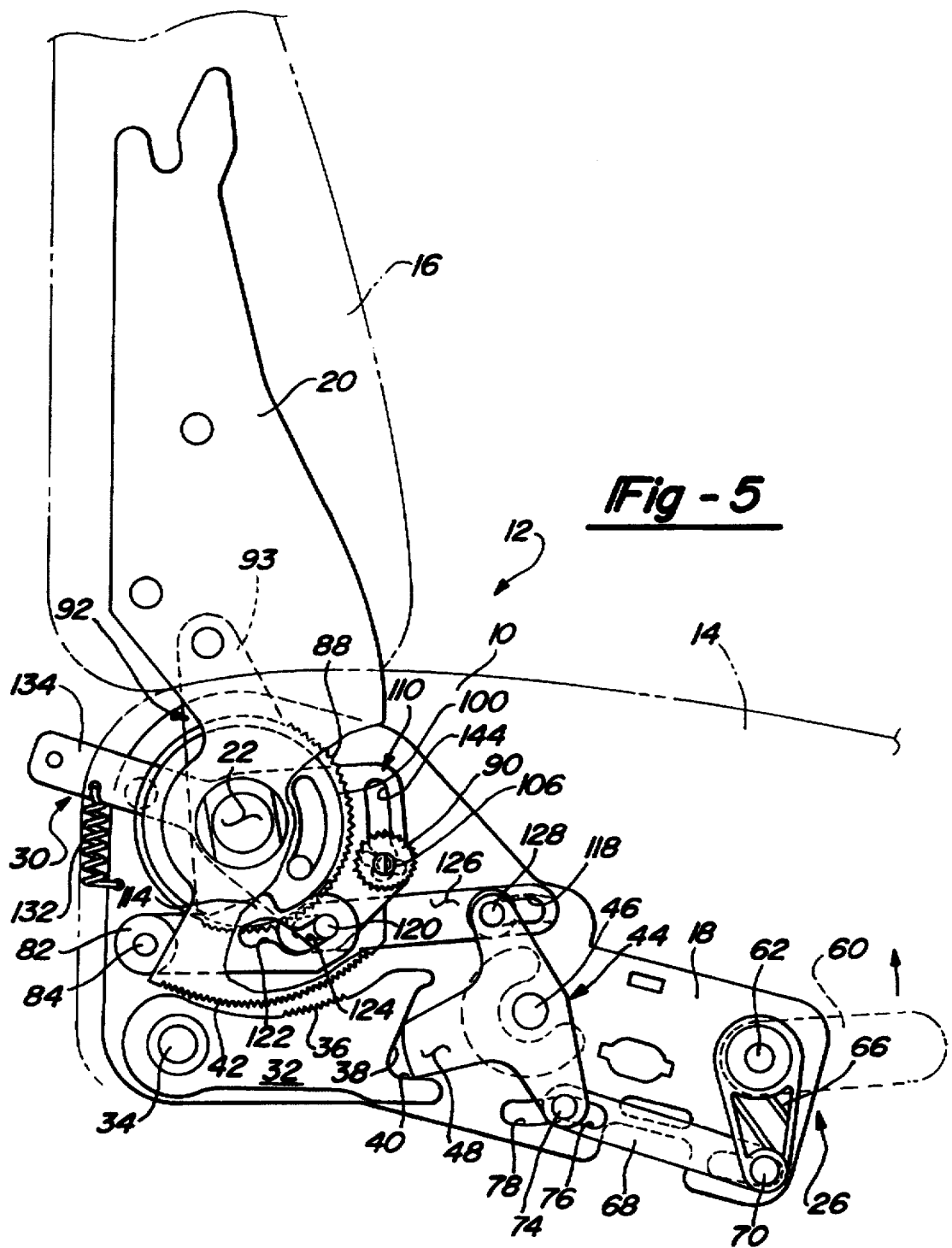
FIG. 5 shows the seat hinge assembly with its latching mechanism in its unlatched mode and its memory mechanism in its non-actuated mode to permit subsequent adjustment of the seatback's reclined position.

According to a preferred construction for seat hinge assembly 10, latching mechanism 24 includes a locking pawl 32 that is mounted to lower hinge member 18 for pivotal movement about a pivot pin 34. Locking pawl 32 is shown to include a rack of locking teeth 36 formed on an exterior surface thereof while its distal end segment is recessed to form a pair of cam surfaces 38 and 40. Latching mechanism 24 also includes a rack of quadrant teeth 42 formed on an arcuate end surface of upper hinge member 20. Locking pawl 32 is pivotably movable about pivot pin 34 between a locked position (FIGS. 1 and 2) and a released position (FIGS. 3–5). With locking pawl 32 in its locked position, locking teeth 36 are in meshed engagement with quadrant teeth 42 of upper hinge member 20, thereby inhibiting pivotal movement of upper hinge member 20 relative to lower hinge member 18 and establishing the latched mode of latching mechanism 24. In contrast, when locking pawl 32 is moved to its released position, locking teeth 36 are displaced from meshed engagement with quadrant teeth 42, thereby permitting pivotal movement of upper hinge member 20 relative to lower hinge member 18 and establishing the unlatched mode of latching mechanism 24.

With continued reference to the drawings, latching mechanism 24 is also shown to include a cam plate 44 that is mounted to lower hinge member 18 for pivotal movement about a pivot post 46. Cam plate 44 is generally T-shaped and includes a first leg segment 48, a second leg segment 50, and a third leg segment 52. First leg segment 48 has an end surface 54 that is maintained in engagement with one or both of cam surfaces 38 and 40 of locking pawl 32. In operation, latching mechanism 24 is shifted between its latched and unlatched modes by rotating cam plate 44 between a first position and a second position which, in turn, causes corresponding movement of locking pawl between its locked and released positions. In particular, FIGS. 1 and 2 illustrate cam plate 44 rotated to its first position whereat end surface 54 of first leg segment 48 engages cam surface 38 of locking pawl 32 to locate locking pawl 32 in its locked position. In contrast, FIGS. 3 through 5 illustrate cam plate 44 rotated to a second position whereat end surface 54 of first leg segment 48 engages cam surfaces 38 and 40 of locking pawl 32 to locate locking pawl 32 in its released position. Alternatively, those skilled in the art will appreciate that other arrangements, such as a guide slot and follower pin arrangement, could be used in substitution to that shown to provide coordinated movement between locking pawl 32 and cam plate 44. Finally, a rewind spring 56 acts between cam plate 44 and lower hinge member 18 for normally biasing cam plate 44 toward its first position, thereby normally biasing latching mechanism 24 into its latched mode. Alternatively, return spring 56 could be installed between lower hinge member 18 and locking pawl 32 for normally biasing locking pawl 32 toward its locked position.

To provide means for rotating cam plate 44 between its first and second positions when it is desired to adjust the reclined position of seatback 16, recline actuator mechanism 26 is shown to include a recline lever 60 (shown in phantom) that is rigidly secured to an actuator shaft 62, and a linkage assembly 64 for connecting handle 60 to cam plate 44. Linkage assembly 64 includes a drive link 66 and a first connector link 68. As shown, one end of drive link 66 is rigidly secured to actuator shaft 62 for common rotation with recline lever 60. The opposite end of drive link 66 is pivotably connected to a first end of first connector link 68 via a hinge pin 70. Hinge pin 70 is shown to extend through a guide slot 72 formed in lower hinge member 18 which is provided to guide movement of drive link 66 and first connector link 68. A drive pin 74 extends outwardly from second leg segment 50 of cam plate 44 and passes through a lost-motion slot 76 formed in the opposite end of first connector link 68. Drive pin 74 also passes through a guide slot 78 formed in lower hinge member 18 which is provided to guide movement of cam plate 44 and first connector link 68. As shown in FIGS. 1 and 2, drive pin 74 is located in close proximity to, or engagement with, a first end 80 of lost-motion slot 76 when cam plate 44 is in its first position.

When it is desired to adjust the reclined position of seatback 16, the seat occupant rotates recline lever 60 in a counterclockwise direction from a recline-latched position shown in FIG. 1 to a recline-released position shown in FIG. 5 which, in turn, causes concurrent counterclockwise rotation of drive link 66. Such counterclockwise rotation of drive link 66 results in forward sliding movement of first connector link 68 which, due to engagement of drive pin 74 with first end 80 of lost-motion slot 76, causes cam plate 44 to be rotated from its first position to its second position in opposition to the biasing of rewind spring 56. As noted, such movement of cam plate 44 from its first position to its second position causes locking pawl 32 to move from its locked position to its released position for shifting latching mechanism 24 from its latched mode into its unlatched mode. Thus, with recline lever 60 held in its recline-released position, the seat occupant is permitted to adjust the reclined position of seatback 16 relative to seat bottom 14. While not shown, it is contemplated that a power spring is installed between upper hinge member 20 and lower hinge member 18 on at least one lateral side of seat assembly 12 to normally bias seatback 16 toward its upright position. Upon release of recline lever 60 by the seat occupant, the biasing of rewind spring 56 forcibly urges cam plate 44 to rotate from its second position to its first position which, in turn, causes movement of locking pawl 32 from its released position to its locked position. Concurrently, such movement of cam plate 44 toward its first position also causes drive pin 74 to engage first end 80 of lost-motion slot 76 for causing rearward sliding movement of first connector link 68 which, in turn, causes clockwise rotation of drive link 66 and recline lever 60, thereby returning recline lever 60 to its recline-latched position. Thus, release of recline lever 60 functions to permit rewind spring 56 to automatically shift latching mechanism 24 out of its unlatched mode and into its latched mode.

In general terms, memory mechanism 28 is normally operable in a "non-actuated" mode for permitting independent actuation of latching mechanism 24 via operation of recline lever 60 when adjustment of the reclined position of seatback 16 is desired. However, when it is desired to move seatback 16 to its forward dumped position, dump actuator mechanism 30 is selectively actuated for shifting memory mechanism 28 from its non-actuated mode into an "actuated" mode. In its actuated mode, memory mechanism 28 functions to mark or identify the current angular position of upper hinge member 20 with respect to lower hinge member 18 and, thus, identify the current reclined position of seatback 16 relative to seat bottom 14. Moreover, dump actuator mechanism 30 operably interconnects memory mechanism 28 to latching mechanism 24 for causing latching mechanism 24 to be shifted into its unlatched mode in response to memory mechanism 28 being shifted into its actuated mode. Furthermore, memory mechanism 28 functions to maintain latching mechanism 24 in its unlatched mode during forward dumping of seatback 16 and thereafter until seatback 16 is returned to its previous reclined position. When seatback 16 is returned to its previous reclined position, memory mechanism 28 is automatically shifted back into its non-actuated mode and latching mechanism 24 is automatically shifted back into its latched mode for relatching seatback 16.

According to a preferred construction for seat hinge assembly 10, memory mechanism 28 includes a memory pawl 82 which is mounted to lower hinge member 18 for pivotal movement about a hinge pin 84 between a locked-out position (FIG. 1) and a cammed position (FIG. 3). Memory mechanism 28 is further shown to include a gear-type indexing assembly comprised of a memory gear 88, an index gear 90, and a sector gear 92. Memory gear 88 is rotatably supported on hinge pin 22 and includes a gear segment 94 having external gear teeth 96 formed thereon. Memory gear 88 also includes a raised cam segment 98 having a circular cam surface 100 with a locking detent 102 formed therein. Sector gear 92 has a plate segment 93 rigidly fixed to upper hinge member 20 for common rotation therewith about hinge pin 22 and a gear segment having gear teeth 104 formed thereon. As best seen from FIG. 2, gear teeth 104 of sector gear 92 are alignable with gear teeth 96 of memory gear 88. Index gear 90 is rotatably supported on a shaft 106 which extends through a cam slot 108 formed in a dump lever 110 and a guide slot 112 formed in lower hinge member 18. As will be detailed hereinafter, dump lever 110 is part of dump actuator mechanism 30 and is mounted for pivotal movement on hinge pin 22. Cam slot 108 works in conjunction with guide slot 112 to cause substantially horizontal movement of index gear 90 in response to rotation of dump lever 110. Finally, memory pawl 82 is shown to include a stop tab 114 that is adapted to be retained within locking detent 102 of memory gear 88 when memory pawl 82 is in its locked-out position. Stop tab 114 has a surface 116 that is adapted to engage cam surface 100 of memory gear 88 when memory pawl 82 is in its cammed position and seatback 16 is folded forwardly.

As noted, dump lever 110 is pivotably supported on hinge pin 22 and is movable between a dump-latched position (FIGS. 1 and 2) and a dump-released position (FIG. 3). In addition to dump lever 110, dump actuator mechanism 30 includes a means for interconnecting dump lever 110 to cam plate 44 and memory pawl 82. Specifically, a drive pin 120 extends outwardly from dump lever 110 and passes through a cam slot 122 in memory pawl 82 and a lost-motion slot 124 formed in one end of a second connector link 126. The opposite end of second connector link 126 is coupled to third leg segment 52 of cam plate 44. In particular, a drive pin 128 extends outwardly from third leg segment 52 of cam plate 44 and passes through a lost-motion slot 118 formed in second connector link 126 as well as through a guide slot 130 formed in lower hinge member 18 for guiding movement of cam plate 44 and second connector link 126. A return spring 132 is mounted between a handle portion 134 of dump lever 110 and lower hinge member 18 for normally biasing dump lever 110 to its dump-latched position. With dump lever 110 in its dump-latched position, drive pin 120 is in close proximity to, or engagement with, a first or forward end 136 of lost-motion slot 124. Likewise, drive pin 120 is shown to be located within a first slot segment 138 of cam slot 122 and memory pawl 82 is shown in its locked-out position. Moreover, drive pin 128 is shown to be in close proximity to, or engagement with, a first or forward end 140 of lost-motion slot 118 in second connector link 126 when cam plate 44 is in its first position.

When it is desired to move seatback 16 from its current reclined position to its forward dumped position, dump actuator mechanism 30 is actuated by moving dump lever 110 in a first or clockwise direction from its dump-latched position of FIG. 1 to its dump-released position of FIG. 3. As seen from FIG. 1, when shaft 106 is located in a first slot segment 142 of cam slot 108, index gear 90 is in a first position whereat it is displaced from meshed engagement with teeth 104 on sector gear 92 and teeth 96 of memory gear 88 while memory pawl 82 is located in its locked-out position so as to define the non-actuated mode of memory mechanism 28. As is also seen, locking pawl 32 is in its locked position and cam plate 44 is in its first position such that latching mechanism 24 is in its latched mode. However, upon initial rotation of dump lever 110, shaft 106 moves into a second slot segment 144 of cam slot 108 which moves index gear 90 into a second position whereat it is meshed with teeth 104 on sector gear 92 and gear teeth 96 on memory gear 88. The location and length of first and second slot segments 142 and 144 are selected to ensure that index gear 90 moves to its second position prior to stop tab 114 on memory pawl 82 being released from locking detent 102 in memory gear 88 and prior to locking pawl 32 being moved from its locked position to its released position.

As seen in FIG. 3, dump lever 110 has been rotated in the clockwise direction to its dump-released position which results in index gear 90 meshing with teeth of memory gear 88 and sector gear 92 at a point defining the current reclined position of seatback 16. In the course of moving dump lever 110 from its dump-latched position (FIG. 1) to its dump-released position (FIG. 3), the retention of drive pin 120 within lost-motion slot 124 of second connector link 126 and within cam slot 122 of memory pawl 82 also causes movement thereof. In particular, such rotation of dump lever 110 causes drive pin 120 to move from first slot segment 138 of cam slot 122 into a second segment 146 thereof, thereby pivotably displacing memory pawl 82 from its locked-out position to its cammed position. In its cammed position, surface 116 on stop tab 114 of memory pawl 82 is located radially outwardly of cam surface 100 of memory gear 88. Also, such movement of drive pin 120 results in its engagement with a second end 148 of lost-motion slot 124 in second connector link 126 which begins to pull second connector link 126 rearwardly. Such rearward movement of second connector link 126 causes first end 140 of lost-motion slot 118 to engage drive pin 128 which pulls on third leg segment 52 of cam plate 44, thereby rotating cam plate 44 from its first position to its second position. As previously noted, such rotation of cam plate 44 also results in the movement of locking pawl 32 from its locked position to its released position. Thus, such rotation of dump lever 110 causes latching mechanism 24 to be shifted into its unlatched mode.

Referring specifically to FIGS. 3 and 4, dump lever 110 is shown in its dump-released position, whereby memory mechanism 28 has been shifted into its actuated mode and latching mechanism 24 has been shifted into its unlatched mode. FIG. 3 illustrates seatback 16 in its reclined position prior to forward dumping thereof with index gear 90 engaging sector gear 92 and memory gear 88, thereby identifying the current position of upper hinge member 20 relative to lower hinge member 18. As seen from FIG. 4, subsequent forward angular movement of seatback 16 about hinge pin 22 toward its forward dumped position causes upper hinge member 20 and sector gear 92 to rotate in a first or clockwise direction. However, since index gear 90 is now meshed with both memory gear 88 and sector gear 92, memory gear 88 is concurrently driven in a first or clockwise direction at the same angular rate as that of sector gear 92. Recalling from FIG. 3 that index gear 90 is meshed with sector gear 92 and memory gear 88 at a point identifying the current reclined position of seatback 16 when dump lever 110 is in its dump-released position and prior to forward dumping of seatback 16, the amount of subsequent angular movement of memory gear 88 generated in response to forward movement of seatback 16 corresponds to the amount of angular movement of seatback 16 from its reclined position to its forward dumped position. Moreover, such rotation of memory gear 88 causes surface 116 of memory pawl 82 to engage cam surface 100 of memory gear 88, thereby holding memory pawl 82 in its cammed position which, due to its connection with locking pawl 32 via second connector link 126 and cam plate 44, is operable to also maintain locking pawl 32 in its released position. Thus, latching mechanism 24 is held in its unlatched mode during forward dumping of seatback 16.

When it is desired to return seatback 16 from its forward dumped position, seatback 16 is pivoted rearwardly about pivot 22 which causes upper hinge member 20 and sector gear 92 to rotate in a second or counterclockwise direction. This counterclockwise rotation of upper hinge member 20 and sector gear 92 causes memory gear 88 to rotate concurrently therewith in a second or counterclockwise direction due to its engagement with index gear 90. Such rotation of memory gear 88 causes surface 116 of memory pawl 82 to continue to bear against cam surface 100 until seatback 16 is located in its previous reclined position. At this seatback position, stop tab 114 is permitted to disengage from cam surface 100 and return spring 132 is permitted to forcibly pivot dump lever 110 in a second or counterclockwise direction from its dump-released position to its dump-latched position. Such counterclockwise rotation of dump lever 110 results in movement of drive pin 120 into first slot segment 138 of cam slot 122 in memory pawl 82, thereby moving memory pawl 82 from its cammed position to its locked-out position for positioning stop tab 114 within locking detent 102 and shifting memory mechanism 28 into its non-actuated mode. Moreover, the biasing of rewind spring 56 is able to rotate cam plate 44 from its second position to its first position due to movement of drive pin 120 within lost-motion slot 124 in second connector link 126. As such, latching mechanism 24 is automatically returned to its latched mode, whereby locking teeth 36 on locking pawl 32 engages quadrant teeth 42 for relatching seatback 16 in its previous reclined position. Preferably, index gear 90 remains in its second position of meshed engagement with sector gear 92 and memory gear 88 until memory pawl 82 is in its locked-out position and locking pawl 32 is in its locked position. This is accomplished by arranging the components such that shaft 106 only enters first slot segment 140 of cam slot 108 when dump lever 110 is near its dump-latched position. This arrangement also functions to ensure engagement of index gear 90 with sector gear 92 and memory gear 88 prior to movement of memory pawl 82 or locking pawl 32 upon actuation of dump actuator mechanism 30.

The number of teeth associated with index gear 90, sector gear 92, and memory gear 88 are preferably selected to cause memory gear 88 to rotate at the same angular speed as sector gear 92 during the forward dumping and subsequent return of seatback 16. Upon movement of seatback 16 from its current reclined position (FIGS. 1 and 3) to its forward dumped position (FIG. 4), memory gear 88 is rotatably indexed in a clockwise direction through a certain angular amount of travel. Memory gear 88 must be rotatably indexed in the counterclockwise direction through precisely the same angular amount of travel in order for stop tab 114 on memory pawl 82 to be released from cam surface 100 of memory gear 88 and to again be aligned with locking detent 102, thereby allowing memory pawl 82 to return to its locked-out position.

As noted, seat hinge assembly 10 is arranged to permit adjustment of the reclined position of seatback 16 via actuation of recline actuator mechanism 26 without actuating memory mechanism 28. Specifically, lost-motion slot 118 in second connector link 126 permits movement of cam plate 44 from its first position to its second position, via rotation of recline lever 60 to its recline-released position of FIG. 5, without causing corresponding movement of second connector link 126, dump lever 110 and memory pawl 82. Thus, latching mechanism 24 can be selectively shifted from its latched mode into its unlatched mode while memory mechanism 28 is maintained in its non-actuated mode. Also, lost-motion slot 76 in first connector link 68 permits rotation of cam plate 44 between its first position and its second position via actuation of memory mechanism 28 without causing a resulting movement of linkage assembly 64 and recline lever 60.

As an additional comfort feature, memory mechanism 28 of seat hinge assembly 10 includes a seatback stop arrangement that functions to prevent rearward reclining movement of seatback 16 upon actuation of dump actuator mechanism 30. Specifically, seatback stop arrangement functions to hold seatback 16 in its reclined position during the time it takes for the seat occupant to start forward dumping of seatback 16 following dump lever 110 being moved to its dump-released position. Seatback stop arrangement includes an arcuate groove 150 formed in cam segment 98 of memory gear 88 and a follower pin 152 fixed to lower hinge member 18 that is retained within groove 150. Thus, when memory mechanism 28 is in its actuated mode with memory pawl 82 located in its cammed position and locking pawl 32 located in its unlatched position, rearward pivotal movement of seatback 16 is prevented by follower pin 152 engaging an end surface 154 of groove 150. Specifically, since memory gear 88 is held against counterclockwise rotation by pin 152 engaging groove end surface 154 and since index gear 90 is meshed with both memory gear 88 and sector gear 92 when dump lever 110 is in its dump-released position, then seatback 16 prevented from moving in a rearward direction. The arc length of groove 150 is selected to permit the predetermined amount of rotation of memory gear 88 that is required for forward pivotal movement of seatback 16 to its full forward dumped position during forward dumping thereof. As such, seatback stop arrangement does not interfere with forward dumping of seatback 16 nor with the return of seatback 16 to its previous reclined position. Finally, seatback stop arrangement only inhibits rearward movement of seatback 16 when memory mechanism 28 is in its actuated mode and, as such, is effectively disabled when memory mechanism 28 is in its non-actuated mode. As a final feature, a rear edge surface of upper hinge member 20 is shown to define a lower detent 156 and an upper detent 158 which are engageable with a stop post 160 extending outwardly from lower hinge member 18 for positively defining the forward and rearward position, respectively, of upper hinge member 20 relative to lower hinge member 18.

The foregoing discussion discloses and describes exemplary embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A seat hinge assembly for use with a seat assembly having a seatback supported for pivotal movement relative to a seat bottom, comprising:

a lower hinge member adapted to be secured to the seat bottom;

an upper hinge member adapted to be fixed to the seatback;

a hinge for supporting said upper hinge member for pivotal movement relative to said lower hinge member;

a latching mechanism operable in a latched mode for securing said upper hinge member in a fixed position relative to said lower hinge member for retaining the seatback in a reclined position, said latching mechanism further operable in an unlatched mode for releasing said upper hinge member for movement relative to said lower hinge member;

a recline actuator mechanism for selectively shifting said latching mechanism from its latched mode into its unlatched mode to permit adjustment of the reclined position of the seatback;

a memory mechanism operable in a non-actuated mode for permitting independent actuation of said latching mechanism, said memory mechanism further operable in an actuated mode for automatically shifting said latching mechanism into its unlatched mode to permit movement of the seatback from its reclined position to a forward dumped position, said memory mechanism including a first gear rotatably supported from said lower hinge member, and a second gear that is disengaged from said first gear when said memory mechanism is in its non-actuated mode and which is adapted to meshingly engage with said first gear at a position corresponding to the reclined position of the seatback upon said memory mechanism being shifted into its actuated mode, wherein said first gear is rotatably indexed in a first direction through a certain amount of angular motion in response to movement of the seatback from its reclined position to its forward dumped position, and wherein said first gear is thereafter rotatably indexed in a second direction through said certain amount of angular motion in response to movement of the seatback from its forward dumped position to its reclined position for causing said memory mechanism to be shifted into its non-actuated mode and said latching mechanism to be shifted into its latched mode for relatching the seatback in its reclined position; and a dump actuator mechanism for selectively shifting said memory mechanism from said non-actuated mode to said actuated mode.

2. The seat hinge assembly of claim 1 wherein said dump actuator mechanism operably interconnects said memory mechanism to said latching mechanism for shifting said latching mechanism into its unlatched mode in response to said memory mechanism being shifted into its actuated mode and for shifting said latching mechanism into its latched mode in response to said memory mechanism being shifted into its non-actuated mode.

3. The seat hinge assembly of claim 1 wherein said memory mechanism further includes a seatback stop mechanism for inhibiting rearward reclining movement of the seatback beyond its reclined position when said memory mechanism is in its actuated mode.

4. The seat hinge assembly of claim 3 wherein said seatback stop arrangement includes an arcuate slot formed in said first gear and a follower pin fixed to said lower hinge member which extends into said first gears said follower pin engages an end surface of said arcuate slot to inhibit rotation of said first gear in said second direction when said upper hinge member is in said position corresponding to the reclined position of the seatback and said memory mechanism is in its actuated mode.

5. The seat hinge assembly of claim 1 wherein said dump actuator mechanism includes a dump lever supported for movement relative to said lower hinge member between a dump-latched position and a dump-released position, wherein said dump lever acts on said second gear such that said second gear is located in a first position displaced from meshed engagement with said first gear when said dump lever is in its dump-latched position, and wherein said second gear is located in a second position in meshed engagement with said first gear when said dump lever is in its dump-released position.

6. The seat hinge assembly of claim 5 wherein said dump actuator mechanism further includes a coupling interconnecting said dump lever to said latching mechanism such that said latching mechanism can be shifted between its latched and unlatched modes via said recline actuator mechanism when said dump lever is in its dump-latched position, wherein movement of said dump lever to its dump-released position causes said latching mechanism to be shifted into its unlatched mode, and wherein subsequent movement of said dump lever to its dump-latched position causes said latching mechanism to return to its latched mode.

7. The seat hinge assembly of claim 1 wherein said memory mechanism further includes a third gear fixed to said upper hinge member, said second gear being in a first position disengaged from said first gear and said third gear when said memory mechanism is in its non-actuated mode and said second gear is located in a second position of meshed engagement with said first gear and said third gear at said position corresponding to the reclined position of the seatback when said memory mechanism is shifted into its actuated mode, wherein subsequent movement of the seatback from its reclined position to its forward dumped position causes forward pivotal movement of said upper hinge member relative to said lower hinge member which causes rotation of said first and third gears in a first direction, and wherein subsequent movement of the seatback from its forward dumped position toward its reclined position causes rearward pivotal movement of upper hinge member relative to said lower hinge member for causing rotation of said first and third gears in a second direction.

8. The seat hinge assembly of claim 7 wherein said dump actuator mechanism includes a dump lever supported for movement relative to said lower hinge member between a dump-latched position and a dump-released position, wherein said dump lever acts on said second gear such that said second gear is located in a first position displaced from meshed engagement with said first gear and said third gear when said dump lever is in its dump-latched position, and wherein said second gear is located in a second position in meshed engagement with said first gear and said third gear when said dump lever is in its dump-released position.

9. The seat hinge assembly of claim 8 wherein said memory mechanism further includes a memory pawl supported from said lower hinge member for movement between a locked-out position whereat a stop tab thereon is retained in a locking detent formed in said third gear for inhibiting rotation of said third gear when said memory mechanism is in its non-actuated mode and a cammed position whereat said stop tab is released from said locking detent for permitting rotation of said third gear when said memory mechanism is in its actuated mode, said memory pawl is operably connected for movement with said dump lever such that said memory pawl is in its locked-out position when said dump lever is in its dump-latched position and said memory pawl is in its cammed position when said dump lever is in its dump-released position, wherein movement of said dump lever to its dump-released position causes said stop tab to move out of engagement with said locking detent in said third gear and causes said second gear to engage said first and third gears at said position corresponding to the reclined position of the seatback, subsequent movement of the seatback from its dumped position causes forward pivotal movement of said upper hinge member which causes said first and third gears to rotate in said first direction for moving stop tab of said memory pawl into engagement with a cam surface on said third gear for maintaining said memory pawl in its cammed position, and wherein subsequent movement of the seatback from its dumped position causes rearward pivotal movement of said upper hinge member which causes said first and third gears to rotate in said second direction until said upper hinge member is located in said position corresponding to the previous reclined position of the seatback whereat said stop tab of said memory pawl disengages said cam surface of said third gear and moves into engagement with said locking detent for permitting said memory pawl to move to its locked-out position.

10. A seat assembly comprising:
   a seat bottom;
   a seatback; and
   a seat hinge assembly having an upper hinge member fixed to said seatback, a lower hinge member fixed to said seat bottom, a pivot supporting said upper hinge member for pivotal movement relative to said lower hinge member, a latching mechanism operable in a latched mode for securing said upper hinge member in a fixed position relative to said lower hinge member for retaining said seatback in a reclined position, said latching mechanism further operable in an unlatched mode for releasing said upper hinge member for movement relative to said lower hinge member, a recline actuator mechanism for selectively shifting said latching mechanism from its latched mode into its unlatched mode to permit adjustment of the reclined position of said seatback, a memory mechanism operable in a non-actuated mode for permitting independent actuation of said latching mechanism, said memory mechanism further operable in an actuated mode for automatically shifting said latching mechanism into its unlatched mode to permit movement of the seatback from its reclined position to a forward dumped position, said memory mechanism including a first gear rotatably supported from said lower hinge member, and a second gear that is disengaged from said first gear when said memory mechanism is in its non-actuated mode and which is adapted to meshingly engage said first gear at a position corresponding to the reclined position of said seatback upon said memory mechanism being shifted into its actuated mode, wherein said first gear is rotatably indexed in a first direction through a certain amount of angular motion in response to movement of said seatback from its reclined position to its forward dumped position, and wherein said first gear is thereafter rotatably indexed in a second direction through said certain amount of angular motion in response to movement of said seatback from its forward dumped position to its reclined position for causing said memory mechanism to be shifted into its non-actuated mode and said latching mechanism to be shifted into its latched mode for relatching said seatback in its reclined position, and a dump actuator mechanism for selectively shifting said memory mechanism from said non-actuated mode to said actuated mode.

11. The seat assembly of claim 10 wherein said dump actuator mechanism operably interconnects said memory mechanism to said latching mechanism for shifting said latching mechanism into its unlatched mode in response to said memory mechanism being shifted into its actuated mode and for shifting said latching mechanism into its latched mode in response to said memory mechanism being shifted into its non-actuated mode.

12. The seat assembly of claim 10 further including a seatback stop arrangement having an arcuate slot formed in said first gear and a follower pin fixed to said lower hinge member which extends into said first gear, said follower pin engages an end surface of said arcuate slot to inhibit rotation of said first gear in said second direction when said upper hinge member is in said position corresponding to the reclined position of said seatback and said memory mechanism is in its actuated mode.

13. The seat assembly of claim 10 wherein said dump actuator mechanism includes a dump lever supported for movement relative to said lower hinge member between a dump-latched position and a dump-released position, and wherein said dump lever acts on said second gear such that said second gear is located in a first position displaced from meshed engagement with said first gear when said dump lever is in its dump-latched position, and said second gear is located in a second position in meshed engaged with said first gear when said dump lever is in its dump-released position.

14. The seat assembly of claim 10 wherein said memory mechanism further includes a third gear rotatably supported from said lower hinge member, said second gear being in a first position disengaged from said first gear and said third gear when said memory mechanism is in its non-actuated mode, and said second gear moves into a second position of meshed engagement with said first gear and said third gear at said position corresponding to the reclined position of said seatback when said memory mechanism is shifted into its actuated mode, wherein subsequent movement of said seatback from its reclined position to its forward dumped position causes forward pivotal movement of said upper hinge member relative to said lower hinge member which causes rotation of said first and third gears in said first direction, and wherein subsequent movement of said seatback from its forward dumped position toward its reclined position causes rearward pivotal movement of upper hinge member relative to said lower hinge member for causing rotation of said first and third gears in said second direction.

15. A seat hinge assembly for use with a seat assembly having a seatback supported for pivotal movement relative to a seat bottom, comprising:

a first hinge member adapted to be secured to the seat bottom;

a second hinge member adapted to be attached to the seatback and which is supported for pivotal movement relative to said first hinge member;

a first latch member supported from said first hinge member for movement between a first position and a second position, said first latch member is operable in its first position to inhibit movement of said second hinge member relative to said first hinge member, and said first latch member is operable in its second position to permit movement of said second hinge member relative to said first hinge member;

a recline actuator mechanism for moving said latch member from its first position to its second position;

a first biasing mechanism for biasing said latch member toward its first position;

a first gear fixed to said second hinge member;

a second gear rotatably supported from one of said first and second hinge members;

a second latch member supported from said first hinge member for movement between a first position and a second position, said second latch member engages said second gear to prevent rotation thereof when in its first position and is released from said second gear to permit rotation thereof when in its second position;

a third gear rotatably supported from said first hinge member for movement between a first position whereat it is released from meshed engagement with said first and second gears and a second position whereat it is in meshed engagement with said first and second gears;

a dump lever supported from said first hinge member for movement between a first position and a second position, said dump lever is operably connected to said first and second latch members and said third gear such that movement of said dump lever from its first position to its second position causes said third gear to move to its second position and said first and second latch members to move to their respective second positions, and movement of said dump lever from its second position to its first position causes said third gear to move to its first position and said first and second latching members to move to their respective first positions;

a second biasing mechanism for normally urging said dump lever toward its first position;

whereby when said dump lever is in its second position said third gear engages said first and second gears at a position corresponding to the reclined position of the seatback, said second gear is thereafter rotatably indexed in a first direction through a certain amount of angular motion in response to angular movement of said first gear and said second hinge member upon movement of the seatback from its reclined position to its forward dumped position, and wherein said second gear is rotatably indexed in a second direction through said certain amount of angular motion in response to angular movement of said first gear and said second hinge member upon movement of the seatback from its forward dumped position to its reclined position.

16. The seat hinge assembly of claim 15 wherein said second biasing means returns said dump lever to its first position in response to movement of the seatback from its forward dumped position to its reclined position.

17. The seat hinge assembly of claim 15 further including a seatback stop arrangement for preventing rotation of said second gear in said second direction when said second hinge member is located in said position corresponding to the reclined position of the seatback and said dump lever is in its first position.

18. A seat hinge assembly for use in a seat assembly having a seatback supported for pivotal movement relative to a seat bottom, comprising:

a lower hinge member adapted to be secured to the seat bottom;

an upper hinge member adapted to be attached to the seatback and which is supported for pivotal movement relative to said lower hinge member;

a locking pawl supported from said lower hinge member for movement between a locked position inhibiting movement of said upper hinge member relative to said lower hinge member and a released position permitting movement of said upper hinge member, whereby movement of said upper hinge member in a first direction corresponds to forward pivotal movement of the seatback toward a forward dumped position and movement of said upper hinge member in a second direction corresponds to rearward pivotal movement of the seatback toward a fully-reclined position;

a cam plate supported from said lower hinge member for movement between a first position and a second position, said cam plate operably connected to said locking pawl such that movement of said cam plate between its first and second positions causes concurrent movement of said locking pawl between its locked and released positions;

a recliner actuator mechanism for moving said cam plate from its first position to its second position to permit adjustment of the reclined position of the seatback;

a memory gear rotatably supported from said lower hinge member, said memory gear having a gear segment and a cam segment with a cam surface having a locking detent formed therein;

a memory pawl supported from said lower hinge member for movement between a locked-out position whereat it is retained in said locking detent for preventing rotation of said memory gear and a cammed position whereat it is released from said locking detent for permitting rotation of said memory gear;

a coupling mechanism operably interconnecting said memory pawl to said cam plate such that said cam plate is permitted to move between its first and second positions when said memory pawl is in its locked-out position, and said coupling mechanism is further operable to move said cam plate between its first position and its second position in response to movement of said memory pawl between its locked-out position and its cammed position; and a dump lever movable between a first position and a second position for causing corresponding movement of said memory pawl between its locked-out and cammed positions;

an index gear which is supported for movement with said dump lever such that when said dump lever is in its first position said index gear is in a first position displaced from said gear segment of said memory gear, and when said dump lever is in its second position said index gear is in a second position meshed with said gear segment of said cam gear; and said dump lever is movable from its first position to its second position for moving said memory pawl from its locked-out position to its cammed position when it is desired to dump the seatback from its reclined position to its forward dumped position, such movement of said dump lever to its second position causes said index gear to move to its second position and engage said gear segment of said memory gear at a position corresponding to the reclined position of the seatback, whereby subsequent forward pivotal movement of the seatback to its forward dumped position causes said upper hinge member to move in said first direction which causes said index gear to rotate said memory gear in a first direction, such rotation of said memory gear in said first direction causes said stop tab of said memory pawl to engage said cam surface of said memory gear and hold said memory pawl in its cammed position, and wherein subsequent rearward pivotal movement of the seatback from its forward dumped position causes said upper hinge member to move in said second direction which causes said index gear to rotate said memory gear in a second direction until said upper hinge member is located in said position corresponding to the previous reclined position of the seatback whereat said memory pawl disengages said cam surface and engages said locking detent of said memory gear, whereby said memory pawl moves to its locked-out position thereby latching the seatback in its previous reclined position.

19. The seat hinge assembly of claim 18 wherein said index gear is mounted on a shaft extending through a guide slot formed in said dump lever such that said index gear is located in its first position for locating said index gear at a position displaced from said gear segment of said memory gear when said dump lever is in its first position, and wherein movement of said dump lever to its second position causes said index gear to move to its second position whereat it is meshed with gear segment of said memory gear.

20. The seat assembly of claim 19 further comprising a sector gear fixed to said second hinge member and which is meshingly engaged with said index gear when said index gear is in its second position, and wherein said index gear is displaced from said sector gear when said index gear is in its first position.

21. The seat hinge assembly of claim 18 further comprising a spring for normally biasing said dump lever toward its first position.

22. The seat hinge assembly of claim 18 wherein said dump lever is operably connected to said coupling mechanism such that when said dump lever is in its first position said memory pawl is in its locked-out position and said cam plate is permitted to move between its first and second positions via actuation of recline actuator mechanism to adjust the reclined position of the seatback, and when said dump lever is in its second position said memory pawl is in its cammed position and said cam plate is in its second position.

23. The seat hinge assembly of claim 18 further comprising a sector gear fixed to said upper hinge member such that said index gear is adapted to mesh with both said memory gear and said sector gear when in its second position, and said index gear is adapted to be displaced from meshed engagement with said memory gear and said sector gar when it its first position.

24. A seat assembly comprising:
a seat bottom;
a seatback; and
a seat hinge assembly interconnecting said seatback for pivotal movement relative to said seat bottom, said seat hinge assembly including a first hinge member fixed to said seat bottom, a second hinge member fixed to said seatback, a hinge pin supporting said second hinge member for pivotal movement on said first hinge member, a locking pawl supported on said first hinge member for movement between a locked position whereat second hinge member is inhibiting from moving for retaining said seatback in a reclined position and a released position whereat said second hinge member is permitted to move for permitting movement of said seatback, a recline lever coupled to said locking pawl for moving said locking pawl from its locked position to its released position, a first spring for biasing said locking pawl toward its first position, a memory gear supported for rotation on said hinge pin and having a detent formed therein, a memory pawl supported on said first hinge member for movement between a locked-out position whereat said memory pawl engages said detent to prevent rotation of said memory gear and a cammed position whereat said memory pawl is released from said detent to permit rotation of said memory gear, an index gear supported from said first hinge member for movement between a first position displaced from said memory gear and a second position in meshed engagement with said memory gear, a dump lever movable between a dump-latched position and a dump-released position, said dump lever acting on said index gear for causing movement of said index gear between its first and second positions in response to movement of said dump lever between its dump-latched and dump-released positions, said dump lever operably connected to said memory pawl for causing movement of said memory pawl between its locked-out and cammed positions in response to movement of said dump lever between its dump-latched and dump-released positions, and said dump lever operably connected to said locking pawl such that movement of said dump lever between its dump-latched and dump-released positions causes movement of said locking pawl between its locked and released positions, and a second spring for biasing said dump lever toward its dump-latched position.

25. The seat assembly of claim 23 wherein said locking pawl has teeth formed therein which are engaged with teeth formed on said second hinge member when said locking pawl is in its locked position.

* * * * *